July 19, 1960
H. W. BABCOCK
2,945,420
ROCKET LAUNCHER
Filed June 13, 1945
2 Sheets-Sheet 1
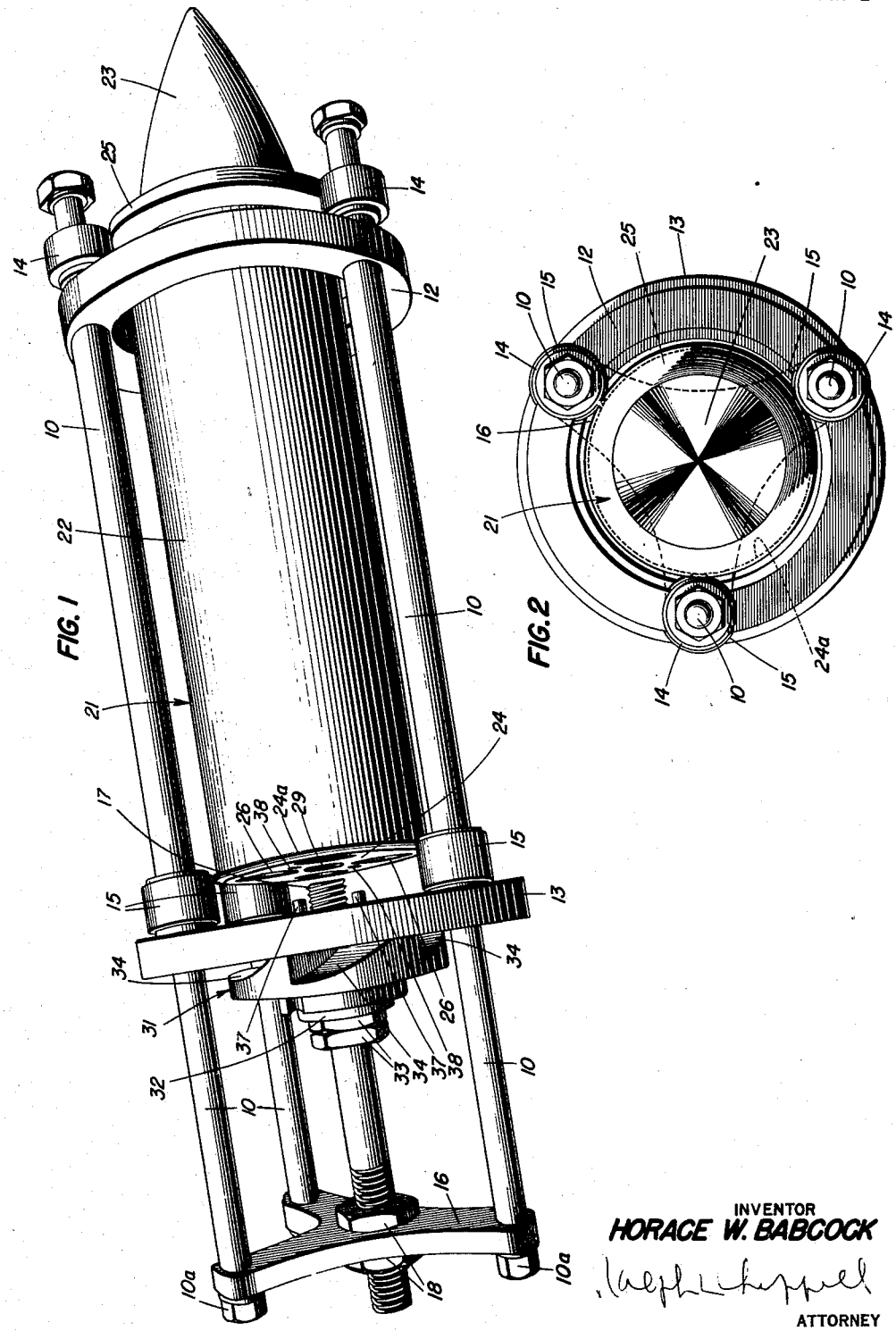
INVENTOR
HORACE W. BABCOCK
ATTORNEY July 19, 1960
H. W. BABCOCK
2,945,420
ROCKET LAUNCHER
Filed June 13, 1945
2 Sheets-Sheet 2
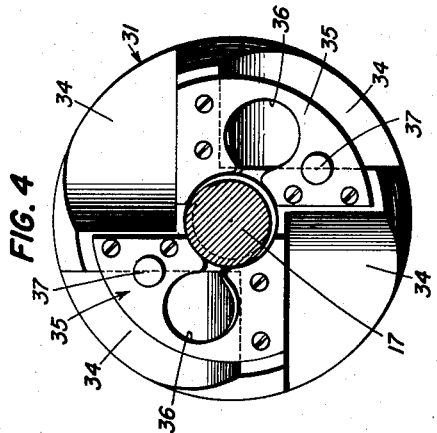
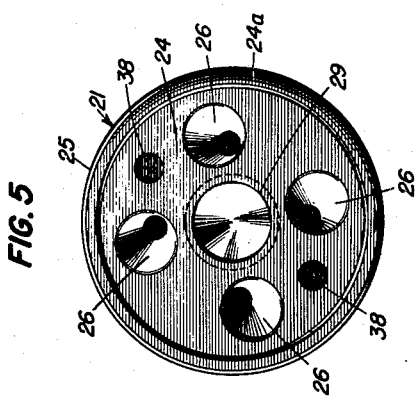
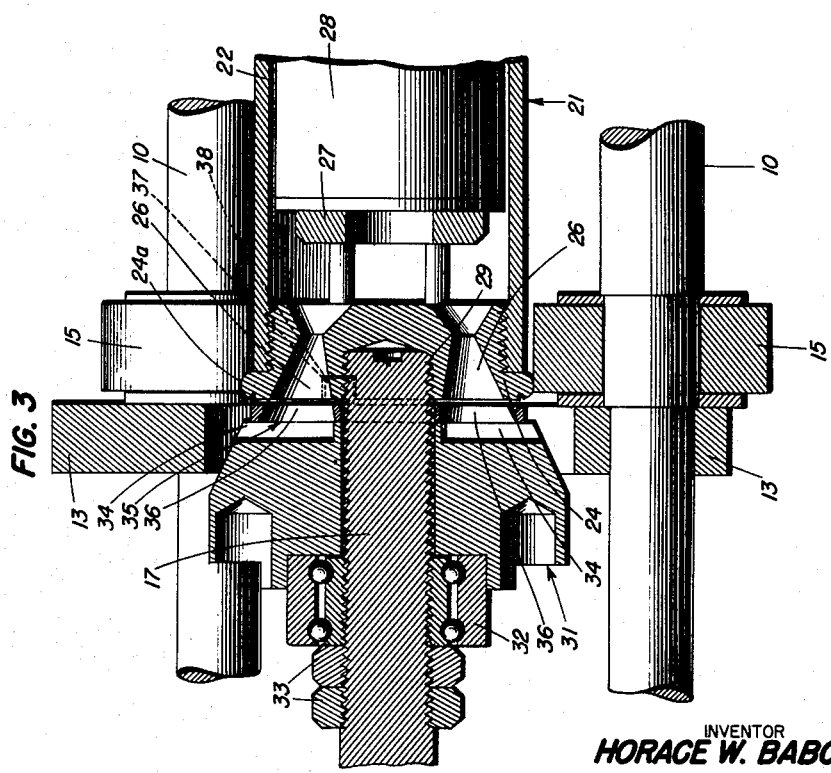
INVENTOR
HORACE W. BABCOCK
BY
ATTORNEY

United States Patent Office 2,945,420
Patented July 19, 1960

2,945,420

ROCKET LAUNCHER

Horace W. Babcock, Pasadena, Calif., assignor to the United States of America as represented by the Secretary of the Navy Filed June 13, 1945, Ser. No. 599,160

2 Claims. (Cl. 89—1.7)

This invention relates to rocket launchers and more particularly to a launcher of novel construction for use with rockets of the type which is stabilized in flight by a spinning motion of the rocket. The launcher of the present invention may be used with rockets of the type which provides its own spinning motion, as described in a copending application of C. E. Weinland, Serial No. 564,337, filed November 20, 1944, or it may be used with the non-rotating type of rocket, in which case the launcher may include means for providing an initial spinning motion of the rocket prior to its launching. In either event, the launcher is adapted to restrain or control the initial movement of the rocket to insure the desired spinning motion when the rocket leaves the launcher.

One object of the present invention resides in the provision of a launcher which supports a rocket at its forward and rear end portions on ball or roller bearings so that the rocket is free to rotate about its longitudinal axis while it is within the launcher.

Another object of the invention is to provide a launcher for rockets which provide their own spinning motion, the launcher including means for initially restraining the rocket so that it develops its required rotational velocity before appreciable progress of the rocket along the launcher.

A further object is to provide a rocket launcher having means operable by the blast from the rocket to impart a spinning motion to the rocket while it is in the launcher.

Still another object is to provide a rocket launcher having a reaction turbine operable by the blast from the rocket and arranged to cause rotation of the rocket or to increase the initial spinning motion of the rocket, depending upon whether the rocket has self-contained means for providing a spinning motion.

An additional object is to provide a rocket launcher which is essentially a "zero" length launcher in that the rocket is in free flight after only a nominal forward travel.

These and other objects of the invention may be better understood by reference to the accompanying drawings, in which Fig. 1 is a perspective view of one form of the new launcher, showing a rocket in the launcher;

Fig. 2 is a front view of the rocket and launcher shown in Fig. 1;

Fig. 3 is a longitudinal sectional view of part of the launcher and rocket illustrated in Figs. 1 and 2, showing the rocket connected to the restraining means and the reaction turbine;

Fig. 4 is a front view of the reaction turbine shown in Fig. 3, and

Fig. 5 is a rear view of the rocket.

The rocket launcher, as shown, comprises three rails 10 in the form of rods. The rods are held in equidistant, parallel relation by a forward ring 12 and a rear ring 13 through which the rods extend. Mounted on the rods in front of the rings 12 and 13 are front and rear roller bearings 14 and 15, respectively. The rods 10 extend rearwardly from the rear ring 13 and are connected at their rear ends to an end plate 16. As illustrated, the rods project through the end plate 16 and their projecting end portions are threaded to receive nuts 10a which are tightened against the plate. A restraining screw 17 extends axially from the end plate 16 in centered relation to the rods 10. The rear end portion of the screw 17 extends through the center of the plate 16 and has adjustment nuts 18 which are screwed against the plate on opposite sides thereof to hold the screw in position. It will be apparent that the clamping nuts 18 may be adjusted to vary the axial position of screw 17 relative to the end plate 16.

A rocket 21 is mounted within the space defined by the bearings 14 and 15 and the rods 10. The rocket, as shown, is of the type having self-contained means for providing a spinning motion to the rocket when it is fired, a rocket of this type being described in said copending application, Serial No. 564,337. More particularly, the illustrated rocket comprises a motor tube 22 closed at its front end by a nose member 23 and at its rear end by a nozzle plate 24 threaded into the tube and having a shoulder 24a slightly greater in diameter than the motor tube. At the base of the nose member 23 is a band 25 which is larger in diameter than the motor tube 22 and the nozzle plate shoulder 24a, the band being integral with the nose member or secured thereto in any suitable manner. The band 25 is adapted to ride snugly between the front bearings 14 to provide initial support for the front end of the rocket, the rear end of the rocket being initially supported in the rear bearings 15. It will be apparent from the foregoing that the front bearings 14 are somewhat smaller in diameter than the rear bearings 15 to provide the additional clearance necessary for the band 25. By reason of the band 25, clearance is provided between the front bearings 14 and the motor tube 22 and shoulder 24a during launching of the rocket, so that when the band 25 and the rear end portion of the rocket clear their respective bearings, the rocket is in free flight.

The nozzle plate 24 has a plurality of nozzles 26 spaced equidistantly about a common center or axis and arranged with the axes of the nozzles canted with respect to the axis of the rocket, as described in said copending application, Serial No. 564,337. Within the motor tube 22, the nozzle plate 24 carries a propellent support 27 for supporting a charge of propellent in the form of a powder grain 28. In the rear face of nozzle plate 24 is a centered, threaded socket 29 into which the front end of the retaining screw 17 is threaded. Accordingly, the rocket 21 is initially held by the restraining screw 17 against any appreciable forward movement in the launcher until the rocket has rotated sufficiently to disengage the restraining screw.

A reaction turbine 31 is mounted on a ball bearing 32 adjustably secured on the restraining screw by adjustment nuts 33. The reaction turbine has a plurality of substantially helical reaction faces 34 at its front end, one face 34 corresponding to each nozzle 26. In the illustrated construction, four nozzles 26 and an equal number of reaction faces 34 are provided. Two of the reaction faces 34 are partly covered by plates 35 having holes 36 which register with the corresponding nozzles 26. The plates 35 are provided for the purpose of mounting pins 37 which extend into small sockets 38 located in the nozzle plate 24, as shown particularly in Figs. 4 and 5. Initially, the pins 37 fit into the sockets 38 so that the reaction turbine, under the influence of the rocket blast, rotates the rocket until the rocket has moved on restraining screw 17 a sufficient distance to clear the pins 37.

In the operation of the new launcher, the guide means comprising the rods 10, rings 12, 13 and bearings 14, 15 are mounted on a suitable support (not shown). The rocket 21 is loaded in the launcher by inserting the rear end of the rocket through the front ring 12 and sliding the rocket rearward in the guide means until the rear end of the rocket engages the restraining screw 17. The rocket is then rotated in the guide means so as to screw the threaded socket 29 over the projecting front end of restraining screw 17, care being taken to insure that the coupling detents 37 of the reaction turbine register with the openings 38 in the rear end of the rocket, so that the detents move into the rocket openings 38 as the rocket is screwed on the restraining screw 17. When the rocket is screwed to its firing position on the retaining screw 17, the rear end of the rocket is supported by a snug fit of shoulder 24a between the rear bearings 15, and the forward end of the rocket is supported by a similar fit of band 25 between the front bearings 14.

When the rocket is fired by ignition of the propellent grain 28, it is initially held by the restraining screw 17 against substantial forward movement. During this period, the discharge blast from the nozzles 26 is deflected by the reaction faces 34 of the turbine so as to rotate the latter. This rotational movement of the turbine 31, under the influence of the rocket blast, is transmitted to the rocket through the coupling pins or detents 37, whereby the tendency for the rocket to rotate is materially increased over that due to canting of the nozzles 26. As the rocket 21 rotates under the action of the turbine and the reaction of the blast from the canted nozzles, it is unscrewed from the retaining screw 17, so that by the time the rocket has moved forward sufficiently to clear the retaining screw 17 and the coupling detents 37, it has attained a high speed of rotation. Since the nozzles 26 are canted, the speed of rotation of the rocket is at least maintained, and in fact increased, as the rocket continues in free flight and the propellent grain 28 continues to burn.

If desired, the reaction turbine 31 may be omitted, in which case the retaining screw 17 in combination with the reaction from the canted nozzles 26 is sufficient to cause a higher speed of rotation of the rocket at the time of launching than would be the case if the restraining screw were omitted. It will be observed that the nozzles 26 need not be canted in order for the rocket to rotate in flight, since the rotational impetus provided by the reaction turbine alone is sufficient to insure continued rotation of the rocket when it leaves the launcher.

I claim:

1. In combination, a spin-stabilized rocket, a rocket launcher having bearings in planetary disposition around the forward and rear ends of the rocket, the rocket being larger in diameter at its forward end portion whereby the rear end portion of the rocket clears the forward bearings in passing through said bearings and the rocket is in free flight immediately upon movement of said forward and rear portions clear of the respective bearings, a reaction turbine rotatably mounted on the launcher and operable by the blast from the rocket, coupling means initially connecting the rocket and turbine for transmitting rotation of the turbine to the rocket, the coupling means being inoperative after an initial forward travel of the rocket in the launcher, and means for initially restraining the rocket against forward movement sufficient to clear said bearings while permitting rotation of the rocket.

2. A rocket launcher comprising a plurality of rods connected in generally parallel spaced relation to define a rocket receiving space, roller bearings on the rods for engaging and rotatably supporting a rocket in said space, a restraining member connected to the rear end portions of the rods and having a threaded portion at its front end for threaded engagement with the rear end of a rocket in said space, a reaction turbine mounted on said member and rotatable by the blast of a rocket in said space, and coupling means on the turbine for engaging the rear end of a rocket in said space to transmit rotation of the turbine to the rocket.

References Cited in the file of this patent

UNITED STATES PATENTS

| 533,572 | Unge | Feb. 5, 1895 |
| 1,018,312 | Gherassimoff | Feb. 20, 1912 |
| 1,602,037 | Mixsell | Oct. 5, 1926 |
| 1,721,704 | Madaschi | July 23, 1929 |
| 2,307,125 | Goddard | Jan. 5, 1943 |
| 2,421,522 | Pope | June 3, 1947 |

FOREIGN PATENTS

| 404,815 | Italy | July 6, 1943 |